(12) United States Patent
Park et al.

(10) Patent No.: US 10,229,789 B2
(45) Date of Patent: Mar. 12, 2019

(54) MULTILAYER THIN-FILM CAPACITOR

(71) Applicant: SAMSUNG ELECTRO-MECHANICS CO., LTD., Suwon-si, Gyeonggi-do (KR)

(72) Inventors: No Il Park, Suwon-si (KR); Hyun Ho Shin, Suwon-si (KR); Seung Mo Lim, Suwon-si (KR); Dong Sik Yoo, Suwon-si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 8 days.

(21) Appl. No.: 15/493,531

(22) Filed: Apr. 21, 2017

(65) Prior Publication Data

US 2018/0122580 A1    May 3, 2018

(30) Foreign Application Priority Data

Oct. 28, 2016 (KR) .................. 10-2016-0142170
Nov. 10, 2016 (KR) .................. 10-2016-0149448

(51) Int. Cl.
*H01G 4/33* (2006.01)
*H01G 4/232* (2006.01)
*H01G 4/012* (2006.01)
*H01G 4/30* (2006.01)

(52) U.S. Cl.
CPC .............. *H01G 4/33* (2013.01); *H01G 4/012* (2013.01); *H01G 4/232* (2013.01); *H01G 4/306* (2013.01)

(58) Field of Classification Search
None
See application file for complete search history.

(56) References Cited

U.S. PATENT DOCUMENTS

| 6,515,842 | B1* | 2/2003 | Hayworth | H01C 7/10 361/303 |
| 7,301,218 | B2* | 11/2007 | Lee | H01L 23/5223 257/535 |
| 7,742,276 | B2 | 6/2010 | Hsu et al. | |
| 8,159,813 | B2* | 4/2012 | Lee | H01G 4/005 361/303 |
| 9,299,498 | B2* | 3/2016 | Armstrong | H05K 3/328 |
| 9,818,548 | B2* | 11/2017 | Saita | H01G 4/33 |

(Continued)

FOREIGN PATENT DOCUMENTS

JP    2013-229582 A    11/2013
KR    10-1380309 B1    4/2014

OTHER PUBLICATIONS

Korean Office Action issued in Korean Patent Application No. 10-2016-0149448, dated Oct. 20, 2017 (with English translation).

*Primary Examiner* — Dion Ferguson
(74) *Attorney, Agent, or Firm* — Morgan Lewis & Bockius LLP

(57) ABSTRACT

A multilayer thin-film capacitor includes a first multilayer body and a second multilayer body spaced apart from each other in a vertical direction by a split layer. The second multilayer body is disposed on a lower surface of the first multilayer body, the first multilayer body constitutes a top capacitor, and the second body constitutes a bottom capacitor. First, second, and third external terminals may be disposed on an upper surface of the first multilayer body and be connected to internal electrode layers of the first and second multilayer bodies.

32 Claims, 11 Drawing Sheets

(56) References Cited

U.S. PATENT DOCUMENTS

| | | | |
|---|---|---|---|
| 2005/0141169 A1* | 6/2005 | Yamasaki | H05K 1/162 |
| | | | 361/306.3 |
| 2012/0188685 A1* | 7/2012 | Feichtinger | H01G 4/30 |
| | | | 361/321.2 |
| 2013/0258545 A1 | 10/2013 | Yano et al. | |
| 2013/0314838 A1 | 11/2013 | Hwang et al. | |
| 2017/0142838 A1* | 5/2017 | Kurosawa | H01G 4/005 |

* cited by examiner

MULTILAYER THIN-FILM CAPACITOR

CROSS-REFERENCE TO RELATED APPLICATION(S)

This application claims benefit of priority to Korean Patent Applications No. 10-2016-0142170 filed on Oct. 28, 2016 and No. 10-2016-0149448 filed on Nov. 10, 2016 in the Korean Intellectual Property Office, the disclosures of which are incorporated herein by reference in their entireties.

BACKGROUND

1. Field

The present disclosure relates to a multilayer thin-film capacitor, and more particularly, to a land-side capacitor (LSC)-type multilayer thin-film capacitor.

2. Description of Related Art

Recently, in order to support the slimming and lightening of next generation application processors (APs) or power management integrated circuits (PMICs) mounted in smartphones, development of multilayer thin-film capacitors that are thinner than general multilayer ceramic capacitors (MLCC) has increased. Particularly, in accordance with the slimming and lightening of decoupling capacitors suppressing noise generated as smartphones operate within a high frequency band, it has been difficult to suppress noise occurring in general multilayer ceramic capacitors. Therefore, demand for multilayer capacitors has continuously increased. It is expected that a land-side capacitor (LSC)-type multilayer thin-film capacitor will be developed for decoupling and for controlling a power ripple depending on repetition of a driving operation of a device due to a high frequency.

Japanese Patent Laid-Open Publication No. 2013-229582 has disclosed a thin-film condenser for improving stability of electrical connections between internal electrode layers and connection electrodes in accordance with the trend for increased development of multilayer thin-film capacitors described above to make an effort to improve reliability of connection of thin-film condensers. However, the reference does not provide additional functions except functions provided by the thin-film condenser according to the related art.

SUMMARY

An aspect of the present disclosure may provide a multilayer thin-film capacitor capable of implementing capacitance flexibility in spite of consisting of one chip, as well as providing functions that may be provided by the thin-film condenser according to the related art.

According to an aspect of the present disclosure, a multilayer thin-film capacitor may include first and second multilayer bodies, first, second, and third external terminals, and a split layer. The first multilayer body has a structure in which a plurality of internal electrode layers and dielectric layers are alternately stacked. The second multilayer body is disposed on a lower surface of the first multilayer body and has a structure in which a plurality of internal electrode layers and dielectric layers are alternately stacked. The first, second, and third external terminals are disposed on an upper surface of the first multilayer body and are connected to the internal electrode layers of the first and second multilayer bodies. The first multilayer body and the second multilayer body may be spaced apart from each other in a vertical direction by the split layer interposed therebetween.

According to another aspect of the present disclosure, a multilayer thin-film capacitor may include first and second multilayer bodies, and first, second, third, and fourth external terminals. The first multilayer body has a structure in which a plurality of internal electrode layers and dielectric layers are alternately stacked. The second multilayer body is disposed on a lower surface of the first multilayer body and has a structure in which a plurality of internal electrode layers and dielectric layers are alternately stacked. The first, second, third, and fourth external terminals are disposed on an upper surface of the first multilayer body. In this case, capacitance formed by the first multilayer body may be different to that formed by the second multilayer body.

According to a further aspect of the present disclosure, a multilayer thin-film capacitor includes first and second bodies, a capacitance splitting part, and one or more external electrodes. The first body includes a stack of alternating dielectric material layers and electrode material layers. The second body includes a stack of alternating dielectric material layers and electrode material layers. The capacitance splitting part is disposed between the first body and the second body stacked in a stacking direction of the stack of dielectric material layers and electrode material layers of the first body. The one or more external electrode layers are each electrically connected to one or more of the electrode material layers in the first body and the electrode material layers in the second body.

According to a further aspect of the present disclosure, a multilayer thin-film capacitor includes first and second bodies and first and second external terminals. The first body includes a stack of alternating dielectric layers and internal electrode layers. The second body is spaced apart from the first body and includes a stack of alternating dielectric layers and internal electrode layers. The first and second external terminals are disposed above the first body in a stacking direction of the stack of alternating dielectric layers and internal electrode layers in the first body, the first external terminal electrically is connected to one or more of the internal electrode layers in the first body, and the second external terminal is electrically connected to one or more of the internal electrode layers in the second body.

According to another aspect of the present disclosure, a multilayer thin-film capacitor includes first and second bodies and one or more external electrodes layers. The first and second bodies each include a stack of alternating dielectric layers and internal electrode layers. The one or more external electrode layers are each electrically connected to one or more of the internal electrode layers in the first body and the internal electrode layers in the second body. The first body and the second body are spaced apart from each other and stacked in a stacking direction of the stack of dielectric layers and internal electrode layers of the first body. The disposition of dielectric layers between the first and second bodies is asymmetric.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, multilayer thin-film capacitors according to exemplary embodiments will be described. However, the present disclosure is not limited thereto.

First Exemplary Embodiment

Figure 1:
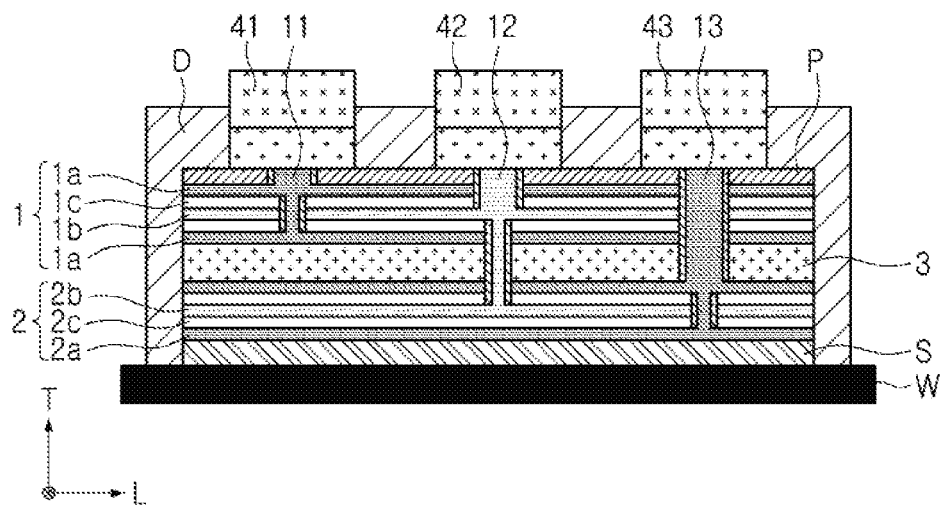
FIG. 1 is a schematic cross-sectional view illustrating a multilayer thin-film capacitor according to a first exemplary embodiment.

FIG. 1 is a schematic cross-sectional view illustrating a multilayer thin-film capacitor according to a first exemplary embodiment.

Referring to FIG. 1, a multilayer thin-film capacitor 100 may include a first multilayer body 1 having a structure in which dielectric layers and internal electrode layers are alternately stacked in a thickness (T) direction and a second multilayer body 2 disposed on a lower surface of the first multilayer body 1 and having a structure in which dielectric layers and internal electrode layers are alternately stacked in the thickness (T) direction. In the present disclosure, the thickness (T) direction refers to a direction in which the dielectric layers and the internal electrode layers are stacked. The first multilayer body and the second multilayer body may be stacked on each other in the same thickness (T) direction as the dielectric layers and internal electrode layers therein.

The first multilayer body 1 and the second multilayer body 2 may be formed by the same manufacturing process. A method of manufacturing the first multilayer body 1 and the second multilayer body 2 is not particularly limited. However, in a manufacturing process, it may be appropriate to complete the first multilayer body 1 after the second multilayer body 2 is formed since the first multilayer body 1 is an upper multilayer body and the second multilayer body 2 is a lower multilayer body within the multilayer thin-film capacitor 100.

An example of a process of forming the first and second multilayer bodies 1 and 2 will be described. First, a silicon (Si) wafer W may be prepared, and an $SiO_2$ layer S may be formed on the Si wafer. Then, first internal electrode layers 2a, dielectric layers 2c, and second internal electrode layers 2b may be sequentially and repeatedly stacked by a thin-film stacking process.

The first and second internal electrode layers 2a and 2b may be formed of a metal selected from the group consisting of Pt, Ir, Ru, Cu, $IrO_2$, and the like, and the dielectric layer(s) 2c may be formed of a dielectric material selected from the group consisting of $BaTiO_3$, barium strontium titanate (BST), $Pb(Zr, Ti)O_3$ [PZT]-based material, a PNZT-based material, and an $SiO_2$-based material.

A thickness of each of the first and second internal electrode layers 2a and 2b and the dielectric layers 2c may be appropriately selected, and each of the first and second internal electrode layers 2a and 2b and the dielectric layers 2c may have a thickness in a sub-micron unit of approximately 1 μm or less, for example, generally 10 nm or more to 300 nm or less.

The numbers of first and second internal electrode layers 2a and 2b and dielectric layers 2c interposed between the first and second internal electrode layers 2a and 2b may be appropriately selected in consideration of required capacitance. For example, the numbers of first and second internal electrode layers 2a and 2b and dielectric layers 2d may be about 200. Since capacitance is formed in a region in which the first and second internal electrode layers 2a and 2b overlap each other, when high capacitance is required, the numbers of stacked first and second internal electrode layers 2a and 2b and dielectric layers 2c may need to be increased.

After the first and second internal electrode layers 2a and 2b and the dielectric layers 2c are alternately stacked depending on capacitance required in the second multilayer body 2, a split layer 3 may be disposed on an upper surface of the second multilayer body 2 in order to distinguish the first multilayer body 1 and the second multilayer body 2 from each other. The split layer 3 may be formed of a material that significantly reduces parasitic capacitance. To this end, the split layer 3 may be formed of a material having insulation properties. The split layer 3 may include, for example, $SiO_2$ or an SiNx-based material, but is not limited thereto.

The split layer 3 may be formed to have a thickness of approximately 500 nm to 1 μm in order to reduce parasitic capacitance generated between the first multilayer body 1 and the second multilayer body 2. However, in some cases, the split layer 3 may be formed to have a thickness of 500 nm or less or 1 μm or more. Therefore, a thickness of the split layer 3 is not particularly limited. However, a thickness of the split layer 3 may be appropriately selected in consideration of an entire thickness of the multilayer thin-film capacitor 100.

Then, first internal electrode layers 1a, dielectric layers 1c, and second internal electrode layers 1b may be sequentially and repeatedly stacked in order to form the first multilayer body 1 on the split layer 3.

After the second multilayer body 2, the split layer 3, and the first multilayer body 1 are formed on the Si wafer W and the SiO$_2$ layer S, a dielectric layer serving as a protecting layer may be selectively formed on an outermost internal electrode layer 1a or 1b of the first multilayer body 1, and an insulating layer P formed of SiNx, SiO$_2$, or the like, may be applied to the dielectric layer to complete formation of a thin-film layer.

Then, vias 11-13 connecting external terminals 41-43 and the internal electrode layers 1a, 1b, 2a, and 2b to each other may be formed using dry etching, and insulating layers of the internal electrode layers may be disposed. Here, the vias 11-13 may linearly penetrate through the internal electrode layers 1a, 1b, 2a, and 2b and the dielectric layers 1c and 2c, as illustrated in FIG. 1, but are not limited thereto. For example, the vias 11-13 may also be dry-etched to have an inclination. That is, shapes of the vias 11-13 are not particularly limited. Insulating layers may be applied to side surfaces of the vias 11-13 depending on an open-circuit or a short-circuit of the external terminals 41-43 connected to the internal electrode layers having different polarities.

Then, processes of forming a seed layer using a metal, forming a passivation layer, etching the seed layer, forming a wiring, and finishing pad surfaces may be performed in order to form the external terminal(s) 41-43. Here, in the process of forming the seed layer, the seed layer may be mainly formed using Ti/W, Ti/Cu, or Ti/Al. Then, the external terminal(s) 41-43 may include Au, Cu, and electroless nickel immersion gold (ENIG) layers of which treatment is completed through an E-beam, sputter, or plating scheme, and the passivation layer D may be formed using a polymer-based material in a region except for an exposed region of the external terminal(s) 41-43.

Then, generally, in order to separate the multilayer thin-film capacitor 100 into individual chips, wafer back grinding, dicing, cleaning, tape and reel packing processes may be sequentially performed.

Again referring to FIG. 1, the multilayer thin-film capacitor 100 according to the first exemplary embodiment may include a first external terminal 41, a second external terminal 42, and a third external terminal 43 disposed on an upper surface of the first multilayer body 1 as the external terminals. The first external terminal 41 and the third external terminal 43 may constitute signal outer pads, and the second external terminal 42 may constitute a ground outer pad.

Substantially, when viewing the multilayer thin-film capacitor 100 from the top, a passivation layer D formed of a polymer-based material may be disposed in a region except a region in which the first, second, and third external terminals 41-43 are exposed.

The first external terminal 41 may be electrically connected to the first internal electrode layers 1a of the first multilayer body 1. The first external terminal 41 and the first internal electrode layers 1a may be connected to each other through a first via 11, and the first via 11 may be disposed to penetrate from the first external terminal 41 up to a lowest first internal electrode layer 1a of the first multilayer body 1.

The second external terminal 42 may be disposed adjacently to the first external terminal 41 and may be connected to the second internal electrode layers 1b of the first multilayer body 1 and the second internal electrode layers 2b of the second multilayer body 2 through a second via 12, and the second via 12 may be disposed to penetrate to the second internal electrode layers 2b of the second multilayer body 2 through the second internal electrode layers 1b of the first multilayer body 1. The second external terminal 42 may be connected to both the second internal electrode layers 1b of the first multilayer body 1 and the second internal electrode layers 2b of the second multilayer body 2 to thus serve as a common terminal of the first multilayer body 1 and the second multilayer body 2.

The third external terminal 43 may be disposed adjacently to the second external terminal 42 and may be connected to the first internal electrode layers 2a of the second multilayer body 2 through a third via 13.

In the multilayer thin-film capacitor 100 according to the first exemplary embodiment, when all of three external terminals 41, 42, and 43 are connected to an electronic device, maximum capacitance may be formed, and in some situations, in a case in which only small capacitance is required, only the first external terminal 41 and the second external terminal 42 may be activated or only the second external terminal 42 and the third external terminal 43 may be activated. Therefore, according to the multilayer thin-film capacitor 100, capacitance flexibility may be implemented without additionally forming a small multilayer thin-film capacitor.

In FIG. 1, capacitance formed by the first multilayer body 1 disposed at an upper portion of the multilayer thin-film capacitor 100 and the first and second external terminals 41 and 42 connected to the internal electrode layers 1a and 1b disposed in the first multilayer body 1 and capacitance formed by the second multilayer body 2 disposed at a lower portion the multilayer thin-film capacitor 100 and the second and third external terminals 42 and 43 connected to the internal electrode layers 2b and 2a disposed in the second multilayer body 2 are the same as each other. Therefore, it may be easy to implement capacitance corresponding to 50% of maximum capacitance implemented when all of the external terminals 41-43 are connected to the electronic device.

Second Exemplary Embodiment

A multilayer thin-film capacitor 200 according to a second exemplary embodiment will be described with reference to FIG. 2. A description overlapping that of the multilayer thin-film capacitor according to the first exemplary embodiment will be omitted, and components substantially overlapping those of FIG. 1 will be denoted by the same reference numerals.

The multilayer thin-film capacitor 200 according to the second exemplary embodiment may include a first multilayer body 1, a second multilayer body 2 disposed below the first multilayer body 1, and a split layer 3 extending in a horizontal direction so as to separate the first and second multilayer bodies from each other in a vertical direction. A first external terminal 41, a second external terminal 42, and a third external terminal 43 may be disposed on an upper surface of the first multilayer body 1. Also in the second exemplary embodiment, the first and third external terminals 41 and 43 may constitute a signal outer pad, and the second external terminal 42 may constitute a ground outer pad.

Figure 2:
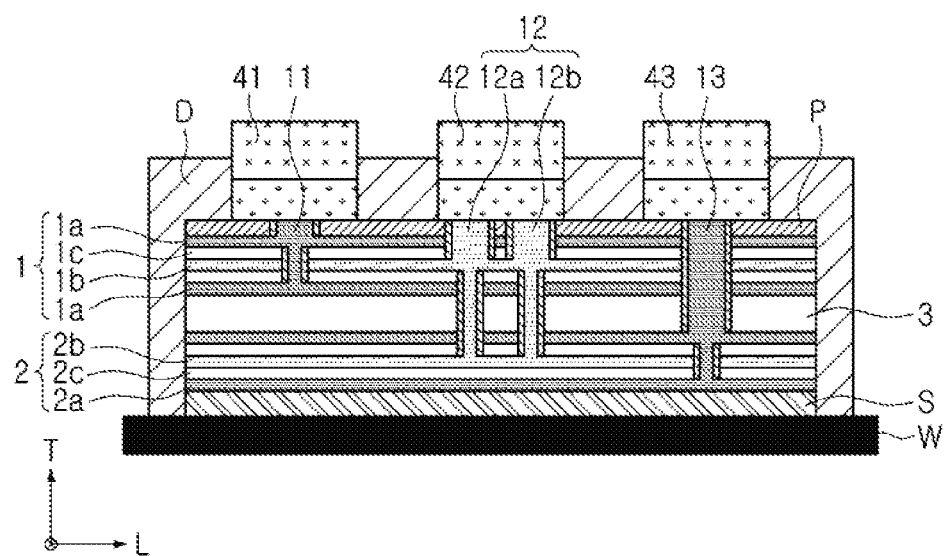
FIG. 2 is a schematic cross-sectional view illustrating a multilayer thin-film capacitor according to a second exemplary embodiment.

Referring to FIG. 2, in the multilayer thin-film capacitor 200, a second via 12 connecting the second external terminal 42, a common external terminal, second internal electrode layers 1b of the first multilayer body 1, and second internal electrode layers 2b of the second multilayer body 2 to one another may consist of a set of plural electrode holes 12a and 12b. The respective electrode holes 12a and 12b may extend from a lower surface of the second external terminal 42 up to the same second internal electrode layers 2b in the second multilayer body 2.

As compared to the multilayer thin-film capacitor 100 according to the first exemplary embodiment, in the multilayer thin-film capacitor 200 according to the second exemplary embodiment, the second via 12 may consist of the plural electrode holes 12a and 12b, such that degrees of freedom of array and formation of individual electrode holes may be high. Therefore, the multilayer thin-film capacitor 200 may be easily modified to form multilayer thin-film capacitors such as those described in relation to third and fourth exemplary embodiments to be described below.

The multilayer thin-film capacitor 200 according to the second exemplary embodiment may also be appropriate for implementing capacitance corresponding to 50% of maximum capacitance since the numbers of internal electrode layers 1a, 1b, 2a, and 2b and dielectric layers 1c and 2c stacked in the first multilayer body 1 and the second multilayer body 2 are the same as each other, as described above.

Third Exemplary Embodiment

Next, a multilayer thin-film capacitor 300 according to a third exemplary embodiment will be described with reference to FIG. 3. A description overlapping that of the multilayer thin-film capacitor according to the first exemplary embodiment will be omitted, and components substantially overlapping those of FIG. 1 will be denoted by the same reference numerals.

The multilayer thin-film capacitor 300 according to the third exemplary embodiment may include a first multilayer body 1, a second multilayer body 2 disposed below the first multilayer body 1, and a split layer 3 extending in a horizontal direction so as to separate the first and second multilayer bodies from each other in a vertical direction. A first external terminal 41, a second external terminal 42, and a third external terminal 43 may be disposed on an upper surface of the first multilayer body 1. Also in the third exemplary embodiment, the first and third external terminals 41 and 43 may constitute a signal outer pad, and the second external terminal 42 may constitute a ground outer pad.

Figure 3:
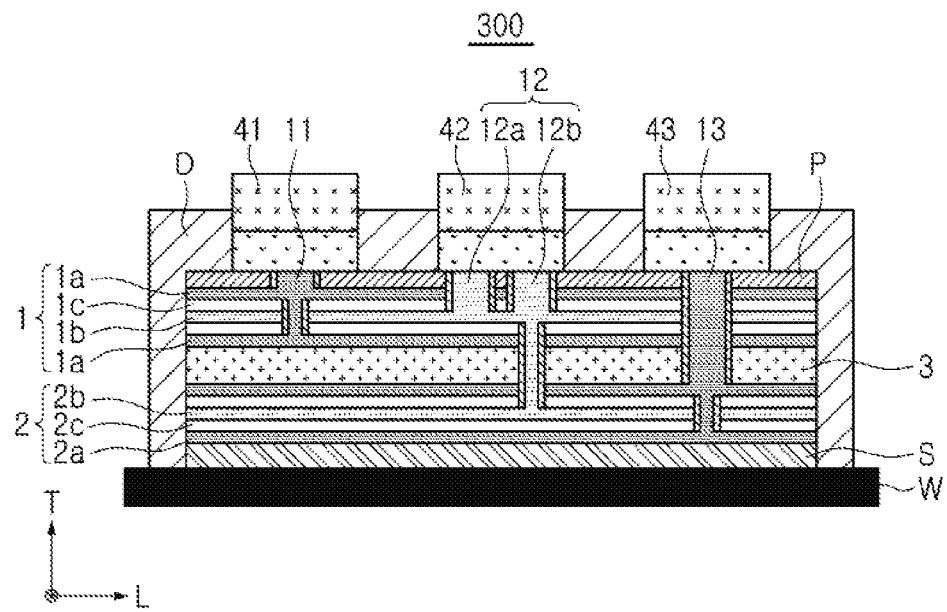
FIG. 3 is a schematic cross-sectional view illustrating a multilayer thin-film capacitor according to a third exemplary embodiment.

Referring to FIG. 3, in the multilayer thin-film capacitor 300, a second via 12 connecting the second external terminal 42, a common external terminal, second internal electrode layers 1b of the first multilayer body 1, and second internal electrode layers 2b of the second multilayer body 2 to one another may consist of a set of plural electrode holes 12a and 12b. In this case, at least one plural electrode hole 12a of the plural electrode holes may penetrate to the second internal electrode layers 1b of the first multilayer body 1, and the other 12b of the plural electrode holes may penetrate to the second internal electrode layers 2b of the second multilayer body 2. Therefore, the via 12 may include electrode holes 12a and 12b having different depths.

As compared to the multilayer thin-film capacitor 100 according to the first exemplary embodiment, in the multilayer thin-film capacitor 300 according to the third exemplary embodiment, the second via 12 may consist of the plural electrode holes 12a and 12b, such that degrees of freedom of array and formation of individual electrode holes may be high. In addition, the multilayer thin-film capacitor 300 according to the third exemplary embodiment may also be appropriate for implementing capacitance equal to 50% of maximum capacitance since the numbers of internal electrode layers 1a, 1b, 2a, and 2b and dielectric layers 1c and 2c stacked in the first multilayer body 1 and the second multilayer body 2 are the same as each other, as described above. In addition, the electrode hole 12a is added, such that it may be decided that the electrode hole 12a only extending to the first multilayer body 1 serves as a main via when capacitance flexibility is implemented using the first multilayer body 1 and the electrode hole 12b extending to both the first multilayer body 1 and the second multilayer body 2 serves as a main via when capacitance flexibility is implemented using the second multilayer body 2.

In addition, the electrode hole 12a of the multilayer thin-film capacitor 300 according to the third exemplary embodiment does not extend to the second multilayer body 2, which may be advantageous in terms of facilitation of manufacturing a process.

Fourth Exemplary Embodiment

Next, a multilayer thin-film capacitor 400 according to a fourth exemplary embodiment will be described with reference to FIG. 4. The multilayer thin-film capacitor 400 according to the fourth exemplary embodiment is similar to the multilayer thin-film capacitor 300 according to the third exemplary embodiment except for a shape of a second external terminal 42. Therefore, a description overlapping that of the multilayer thin-film capacitor according to the third exemplary embodiment will be omitted, and components substantially overlapping those of FIG. 3 will be denoted by the same reference numerals.

The multilayer thin-film capacitor 400 according to the fourth exemplary embodiment may include a first multilayer body 1, a second multilayer body 2 disposed below the first multilayer body 1, and a split layer 3 extending in a horizontal direction so as to separate the first and second multilayer bodies from each other in a vertical direction. A first external terminal 41, a second external terminal 42, and a third external terminal 43 may be disposed on an upper surface of the first multilayer body 1. Also in the fourth exemplary embodiment, the first and third external terminals 41 and 43 may constitute a signal outer pad, and the second external terminal 42 may constitute a ground outer pad.

Figure 4:
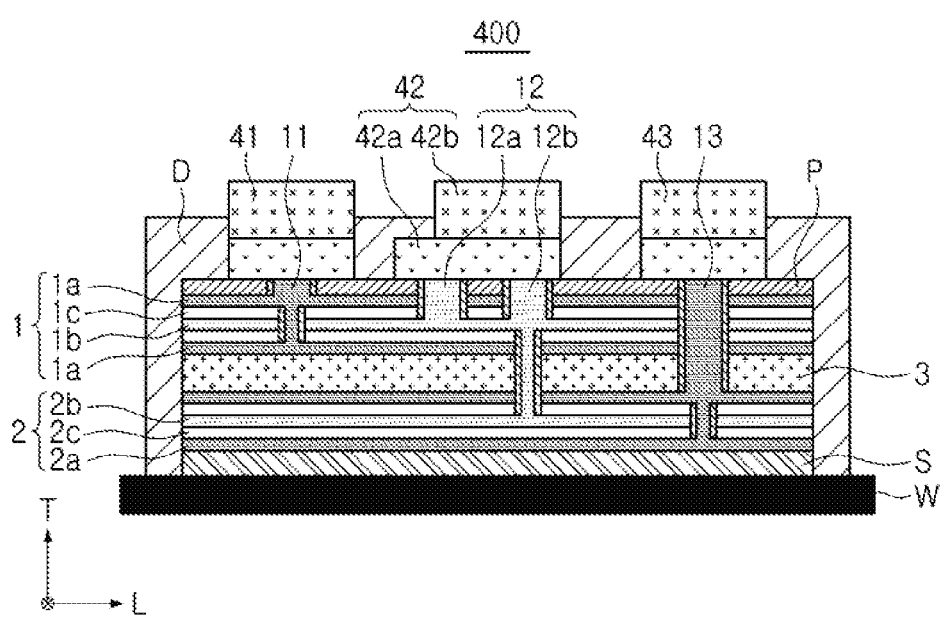
FIG. 4 is a schematic cross-sectional view illustrating a multilayer thin-film capacitor according to a fourth exemplary embodiment.

Referring to FIG. 4, in the multilayer thin-film capacitor 400, a surface area of a lowest conductive layer 42a in the second external terminal 42 may be greater than that of a conductive layer 42b disposed on the lowest conductive layer 42a. In this case, a wide space in which one electrode hole 12a of a second via 12 connecting the second external terminal 42 and second internal electrode layers 1b of the first multilayer body 1 to each other and the other electrode hole 12b of the second via 12 connecting the second external terminal 42 and second internal electrode layers 2b of the second multilayer body to each other may be disposed may be secured without changing an area of the portion 42b of the second external electrode 42 that is exposed to a surface of the multilayer thin-film capacitor 400. Generally, a relatively large amount of stress is applied to a surface of an external terminal in which a via is formed. However, in a case in which the area of the lowest conductive layer 42a of the second external terminal 42 is large as in the multilayer thin-film capacitor 400, stress, or the like, applied to a surface of the second external terminal 42 may be effectively dispersed.

Meanwhile in certain examples, although not illustrated, the one electrode hole 12a of the second via 12 does not only extend to the second internal electrode layers 1b of the first multilayer body 1, but may also extend to the second internal electrode layers 2b of the second multilayer body 2.

Fifth Exemplary Embodiment

Meanwhile, multilayer thin-film capacitors according to a fifth exemplary embodiment have substantially the same structures as those of the multilayer thin-film capacitors described above except that the numbers of first vias 11 and third vias 13 are plural. This is to emphasize a degree of freedom in arraying vias of multilayer thin-film capacitors according to the present disclosure, and the numbers of vias are not particularly limited, but may be appropriately set in consideration of required characteristics such as exposure areas of internal electrode layers, and the like.

Figure 5A:
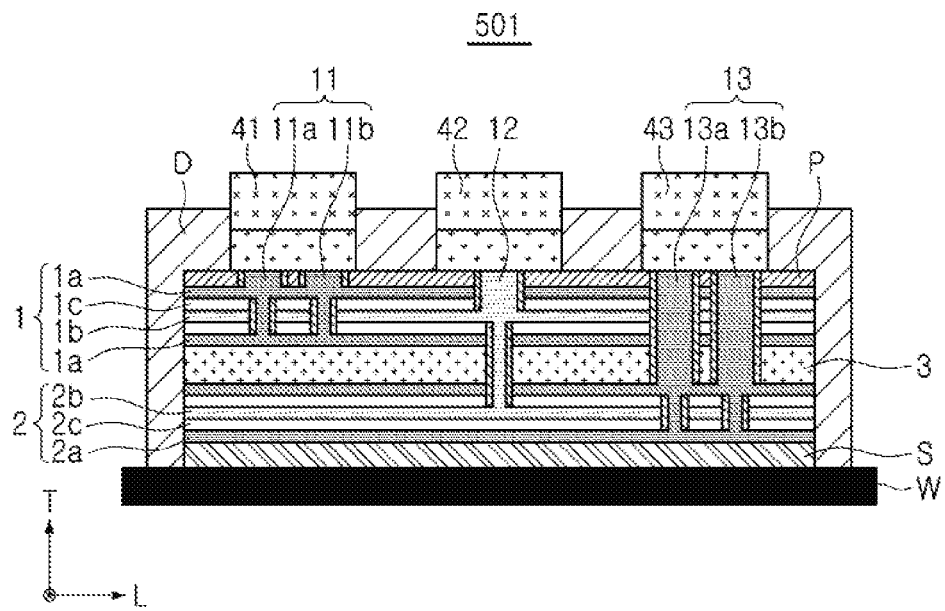
FIGS. 5A through 5D are schematic cross-sectional views illustrating multilayer thin-film capacitors according to modified exemplary embodiments (fifth exemplary embodiments) of the first to fourth exemplary embodiments, respectively.
Figure 5B:
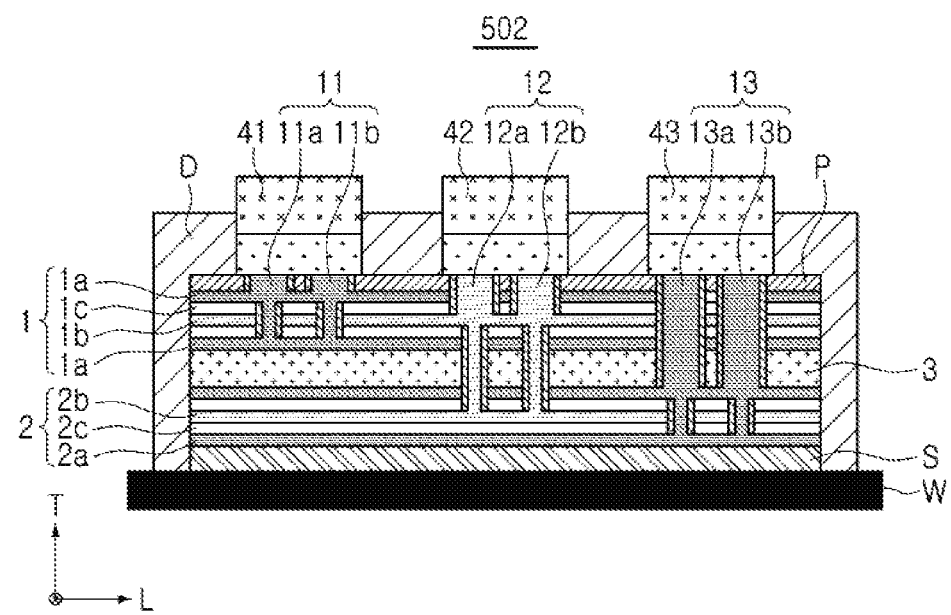
Figure 5C:
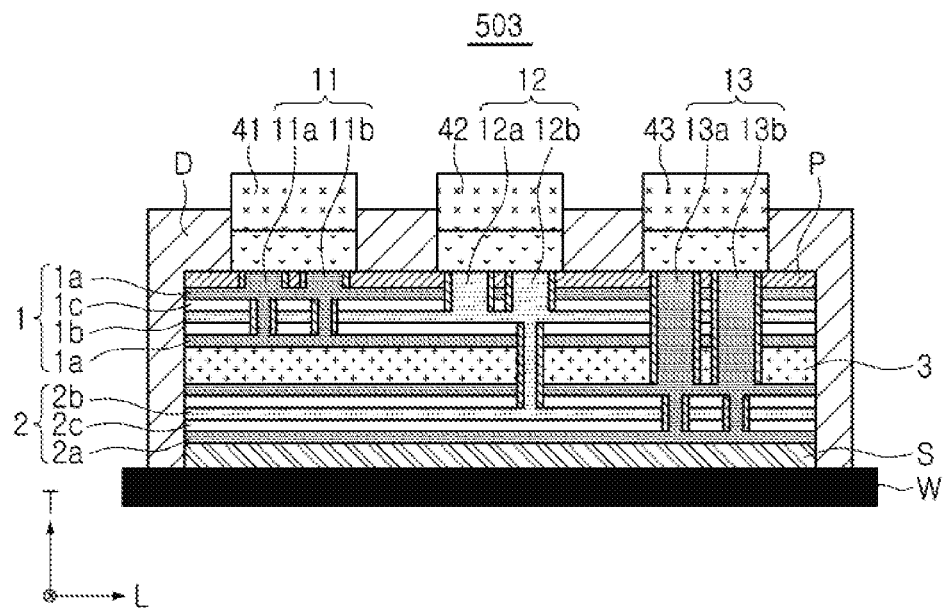
Figure 5D:
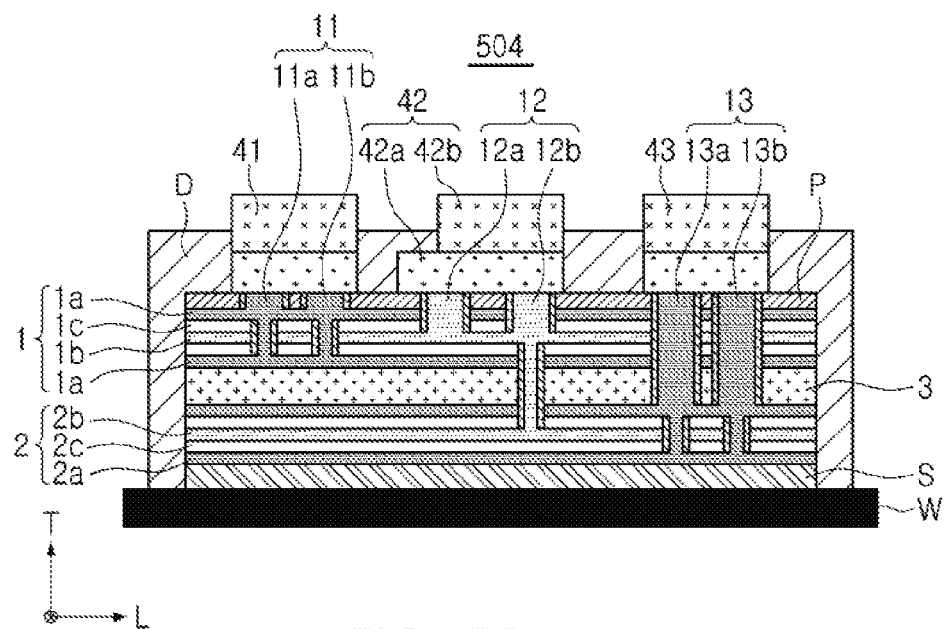

In detail, FIG. 5A illustrates a case of a multilayer thin-film capacitor 501 in which a plurality of first vias 11a and 11b and a plurality of third vias 13a and 13b are formed instead of the first via 11 and the third via 13 of the multilayer thin-film capacitor according to the first exemplary embodiment, FIG. 5B illustrates a case of a multilayer thin-film capacitor 502 in which a plurality of first vias 11a and 11b and a plurality of third vias 13a and 13b are formed instead of the first via 11 and the third via 13 of the multilayer thin-film capacitor according to the second exemplary embodiment, FIG. 5C illustrates a case of a multilayer thin-film capacitor 503 in which a plurality of first vias 11a and 11b and a plurality of third vias 13a and 13b are formed instead of the first via 11 and the third via 13 of the multilayer thin-film capacitor according to the third exemplary embodiment, and FIG. 5D illustrates a case of a multilayer thin-film capacitor 504 in which a plurality of first vias 11a and 11b and a plurality of third vias 13a and 13b are formed instead of the first via 11 and the third via 13 of the multilayer thin-film capacitor according to the fourth exemplary embodiment.

Sixth Exemplary Embodiment

A multilayer thin-film capacitor according to a sixth exemplary embodiment may include a first multilayer body 1 and a second multilayer body 2 disposed below the first multilayer body 1. The first multilayer body 1 may have a structure in which dielectric layers 1c and internal electrode layers 1a and 1b are alternately stacked, and the second multilayer body 2 may have a structure in which dielectric layers 2c and internal electrode layers 2a and 2b are alternately stacked.

Meanwhile, the multilayer thin-film capacitor 600 according to the sixth exemplary embodiment may further include an additional external terminal unlike the multilayer thin-film capacitors according to the first to fifth exemplary embodiments described above. The additional external terminal may be disposed on an upper surface of the first multilayer body 1.

The multilayer thin-film capacitor according to the sixth exemplary embodiment may include a first external terminal 41 connected to first internal electrode layers 1a of the first multilayer body 1 by a first via 11, a second external terminal 42 connected to second internal electrode layers 1b of the first multilayer body 1 by a second via 12, and a third external terminal 43 connected to second internal electrode layers 2b of the second multilayer body 2 by a third via 13, and may include a fourth external terminal 44 connected to first internal electrode layers 2a of the second multilayer body 2 by a fourth via 14.

Figure 6:
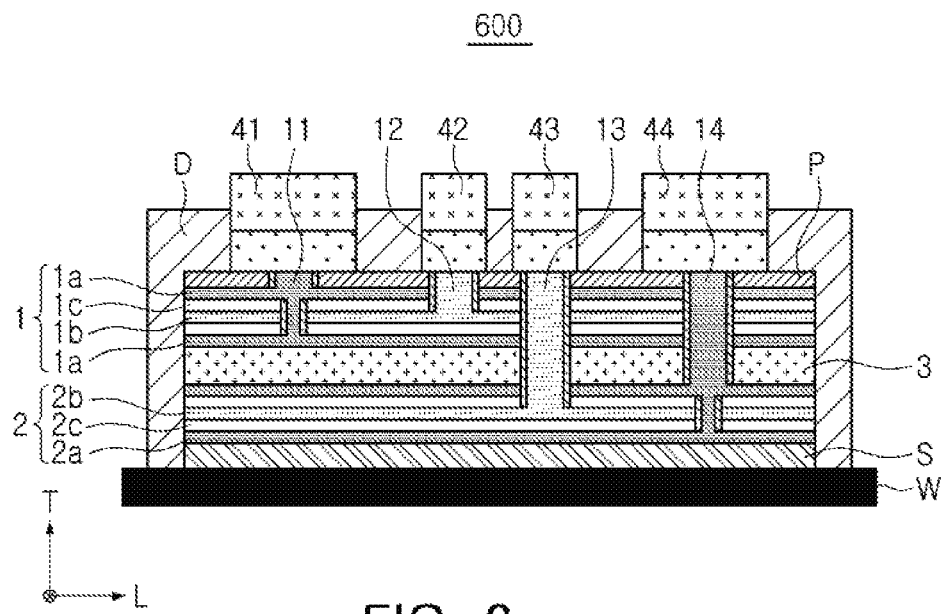
FIG. 6 is a schematic cross-sectional view illustrating a multilayer thin-film capacitor according to a sixth exemplary embodiment.

Referring to FIG. 6, the first multilayer body 1 and the second multilayer body 2 may be spaced apart from each other in a vertical direction by a split layer 3, and the first external terminal 41 and the fourth external terminal 44 may constitute a signal outer pad and the second external terminal 42 and the third external terminal 43 may constitute a ground outer pad.

The first multilayer body 1 and the second multilayer body 2 according to the sixth exemplary embodiment do not share the respective vias with each other, such that they may be advantageous in being operated as individual capacitors.

Seventh Exemplary Embodiment

Figure 7:
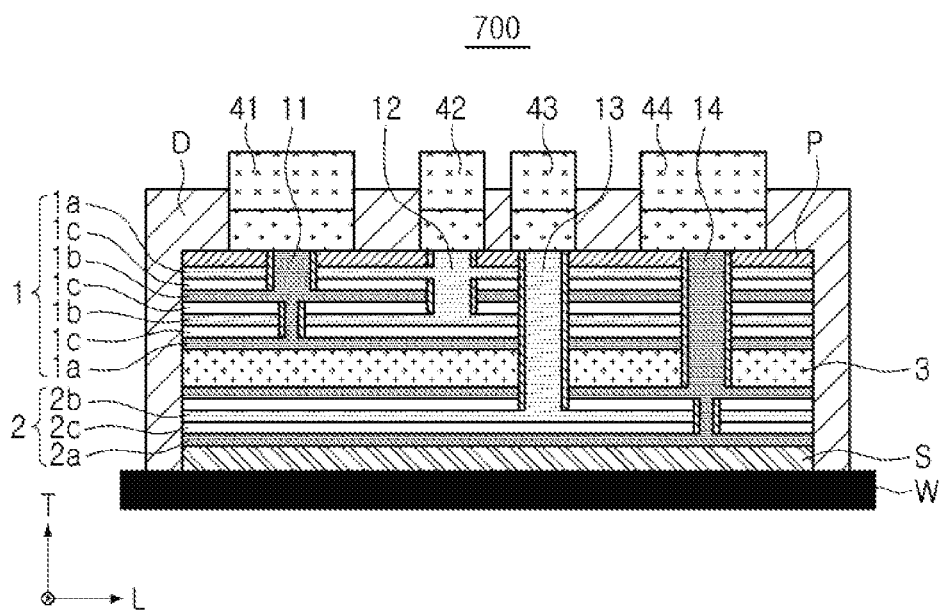
FIG. 7 is a schematic cross-sectional view illustrating a multilayer thin-film capacitor according to a seventh exemplary embodiment.
Figure 8:
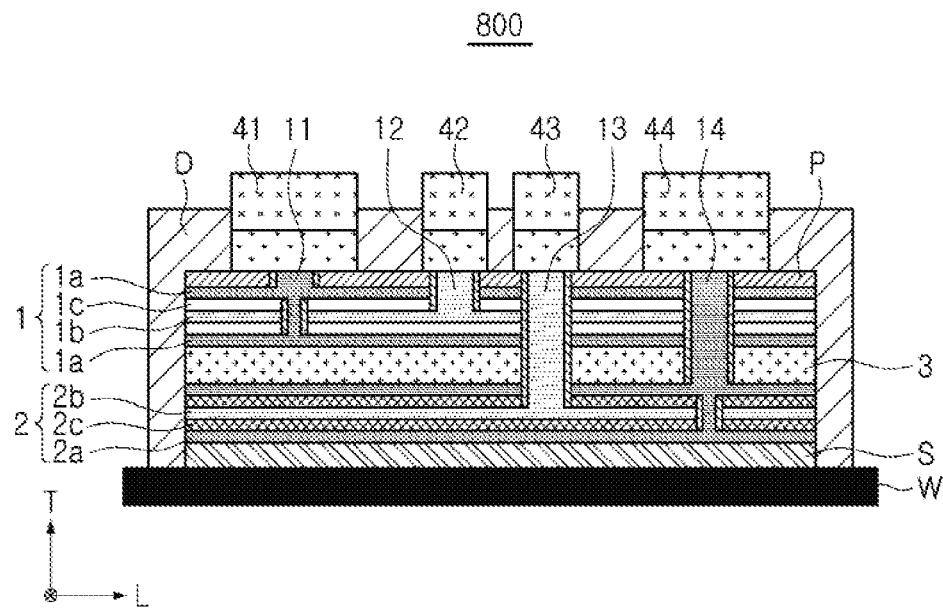
FIG. 8 is a schematic cross-sectional view illustrating a multilayer thin-film capacitor according to an eighth exemplary embodiment.
Figure 9:
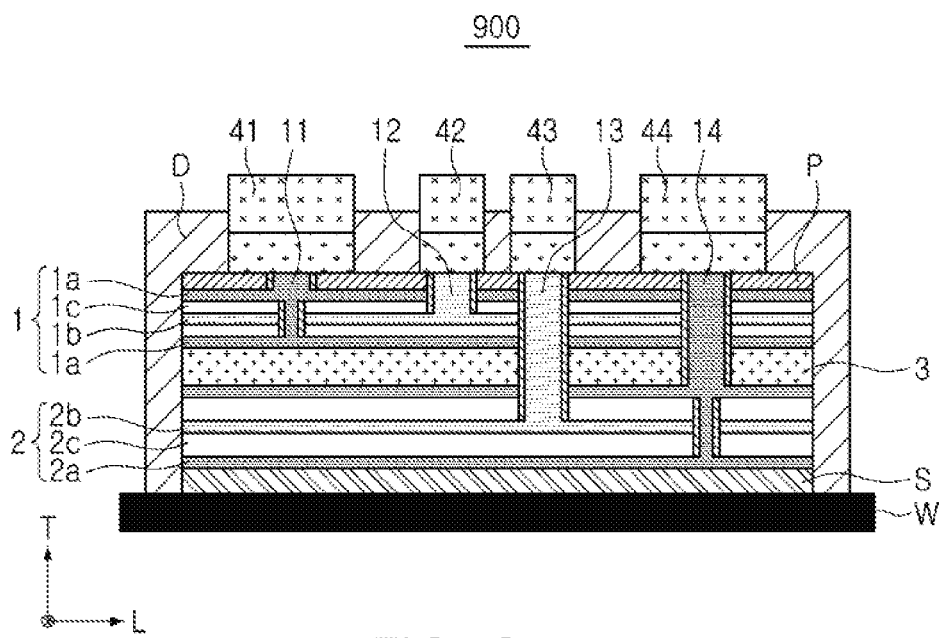
FIG. 9 is a schematic cross-sectional view illustrating a multilayer thin-film capacitor according to a ninth exemplary embodiment.
Figure 10:
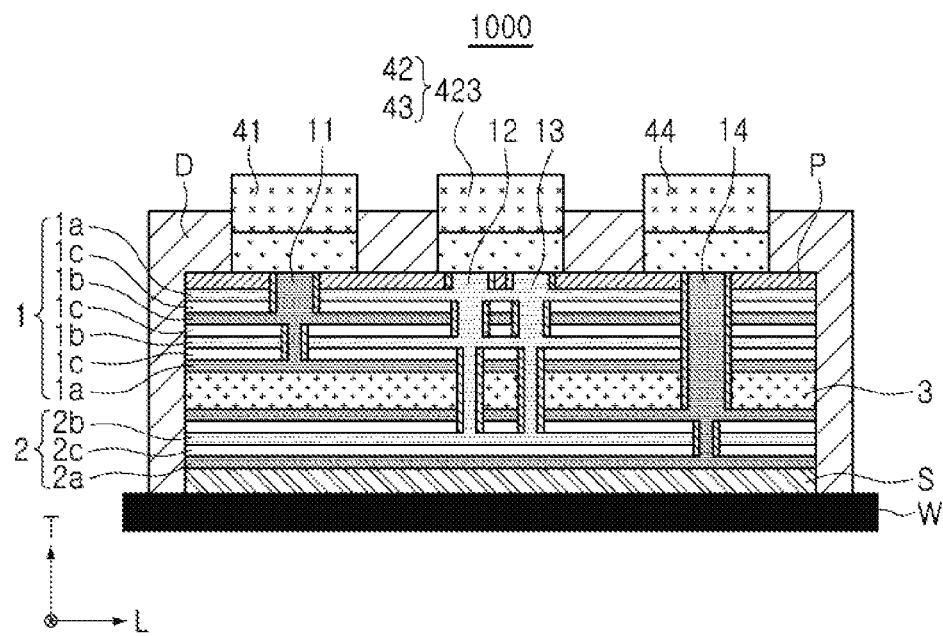
FIG. 10 is a schematic cross-sectional view illustrating a multilayer thin-film capacitor according to a tenth exemplary embodiment.

Next, a multilayer thin-film capacitor 700 according to a seventh exemplary embodiment will be described with reference to FIG. 7. The multilayer thin-film capacitor 700 according to the seventh exemplary embodiment is different from the multilayer thin-film capacitor 600 according to the sixth exemplary embodiment in that the number of dielectric layers 1c stacked in a first multilayer body 1 is greater than that of dielectric layers 2c stacked in a second multilayer body 2, and this difference will be mainly described. The different numbers of dielectric layers in the first and second bodies provides for an asymmetric disposition of dielectric layers between the first and second bodies.

In the multilayer thin-film capacitor 700 according to the seventh exemplary embodiment, capacitance formed by the first multilayer body 1 may be greater than that formed by the second multilayer body 2. This may be appreciated from the fact that the numbers of dielectric layers 1c and 2c interposed between first and second internal electrode layers 1a, 1b, 2a, and 2b in the first multilayer body 1 and the second multilayer body 2 are different from each other, and when the dielectric layers 1c and 2c are formed at the same thickness using the same material in the first and second multilayer bodies 1 and 2, the number of dielectric layers 1c and 2c in the first and second multilayer bodies 1 and 2 are different from each other to allow the capacitance formed by the first multilayer body 1 and the capacitance formed by the second multilayer body 2 to be different from each other, such that capacitance flexibility may be easily implemented.

Eighth Exemplary Embodiment

In a multilayer thin-film capacitor 800 according to an eighth exemplary embodiment, materials of dielectric layers 1c of a first multilayer body and dielectric layers 2c of a second multilayer body may be different from each other. For example, a material having a high dielectric constant may be used as a material of first dielectric layer 1c, and a material having a dielectric constant relatively lower than that of the first dielectric layer may be used as a material of a second dielectric layer 2c to allow capacitance of the first multilayer body 1 and capacitance of the second multilayer body 2 to be different from each other. The different materials used for dielectric layers in the first and second bodies provides for an asymmetric disposition of dielectric layers between the first and second bodies.

In detail, a material of a dielectric layer used in order to implement a high dielectric constant may be a metal-based material such as $ZrO_2$, $HfO_2$, $La_2O_3$, $TiO_2$, BST, PZT, or the like, and a material of a dielectric layer used in order to implement a relatively low dielectric constant may be $SiO_2$, $Si_3N_4$, $Al_2O_3$, or the like. However, the materials of the dielectric layers are not limited thereto. Meanwhile, the abovementioned materials used in the dielectric layers 1c and 2c may be used in the multilayer thin-film capacitor 800 by various deposition methods such as sputtering, sol-gel, chemical vapor deposition (CVD), physical vapor deposition (PVD), plasma-enhanced CVD (PECVD), atomic layer deposition (ALD), atomic layer CVD (ALCVD), and the like. Since dielectric constant characteristics of dielectric materials may be variously changed by changing heat treatment conditions of these deposition methods, composition ratios of the dielectric materials, or the like, the high dielectric constant or the low dielectric constant is not limited to being implemented by only certain materials, but may be implemented by materials formed using different selected manufacturing and deposition methods.

Ninth Exemplary Embodiment

In a multilayer thin-film capacitor 900 according to a ninth exemplary embodiment, dielectric layers 2c of a second multilayer body 2 may be formed using the same material as that of dielectric layers 1c of a first multilayer body 1, but may be formed to have a thickness greater than that of the dielectric layers 1c of the first multilayer body 1. Although not illustrated, in an opposite case, the dielectric layers 1c of the first multilayer body 1 may alternatively be formed to have a thickness greater than that of the dielectric layers 2c of the second multilayer body 2. The different thicknesses of dielectric layers in the first and second bodies provides for an asymmetric disposition of dielectric layers between the first and second bodies.

The respective dielectric layers 1c and 2c in the first and second multilayer bodies 1 and 2 may be formed to have different thicknesses to allow capacitance formed by the first multilayer body 1 and capacitance formed by the second multilayer body 2 to be different from each other, and a ratio (T2/T1) of the thickness T2 of the dielectric layer 2c in the second multilayer body 2 to the thickness T1 of the dielectric layer 1c in the first multilayer body 1 is not limited to being within a certain numerical range, but may in one example be in a range of 1.5 or more to 3.0 or less, a range including a case in which different dielectric materials are used in the first and second multilayer bodies 1 and 2. The ratio (T2/T1) may be in a range of 1.5 or more to 3.0 or less in a case in which the same dielectric material is used in the first and second multilayer bodies 1 and 2. This may include a case in which a difference between thicknesses of dielectric layers appears due to a difference between electrical and thermal characteristics of materials having dielectric properties.

In a case in which the ratio (T2/T1) is lower than 1.5, when dielectric layers having high magnetic permeability are included in the first and second multilayer bodies 1 and 2 and the thickness T1 is gradually reduced, there is a risk that deterioration of electrical characteristics such as a leakage current, or the like, will occur. In addition, when dielectric layers having low magnetic permeability are included in the first and second multilayer bodies 1 and 2 and the thickness T1 is gradually reduced, there is a limitation in equipment. In addition, when the ratio (T2/T1) is greater than 3.0, a difference between the thicknesses is excessively large, such that two difficulties need to be solved, namely miniaturization of the multilayer thin-film capacitor and overcoming limitations of equipment.

Tenth Exemplary Embodiment

Next, a multilayer thin-film capacitor 1000 according to a tenth exemplary embodiment is different from the multilayer thin-film capacitor 700 according to the seventh exemplary embodiment, in that a second external terminal 42 and a third external terminal 43 share a seed layer and a plating layer with each other to constitute a common external terminal 423.

In the multilayer thin-film capacitor 1000 according to the tenth exemplary embodiment, both of a second via 12 and a third via 13 may be connected to the common external terminal 423. Here, the second via 12 may extend to second internal electrode layers 2b of a second multilayer body and the third via 13 may also extend to the second internal electrode layers 2b, such that depths of the second and third vias may be substantially the same as each other.

Meanwhile, in the multilayer thin-film capacitor 1000 according to the tenth exemplary embodiment, a case in which areas of the same internal electrode layers exposed by the second via 12 and the third via 13 are the same as each other is illustrated. Therefore, a case in which a diameter of a cross section of the second via 12 and a diameter of a cross section of the third via 13 are the same as each other in relation to the same height is illustrated. However, the diameter of the cross section of the second via 12 and the diameter of the cross section of the third via 13 are not limited thereto, but may also be different from each other in a modification (not illustrated) of the tenth exemplary embodiment. In a case in which the diameters of the cross sections of the second via 12 and the third via 13 are different from each other, areas of the second internal electrode layers 1b and 2b exposed by the second via 12 and the third via 13 may be different from each other, such that an equivalent series resistance (ESR) value may be appropriately changed.

Eleventh Exemplary Embodiment

Figure 11:
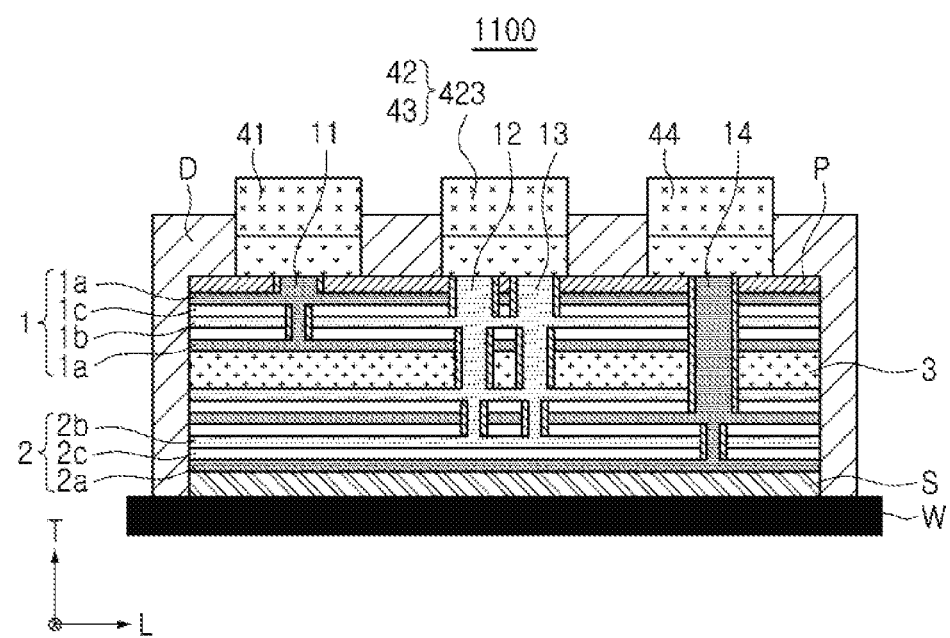
FIG. 11 is a schematic cross-sectional view illustrating a multilayer thin-film capacitor according to an eleventh exemplary embodiment.
Figure 12:
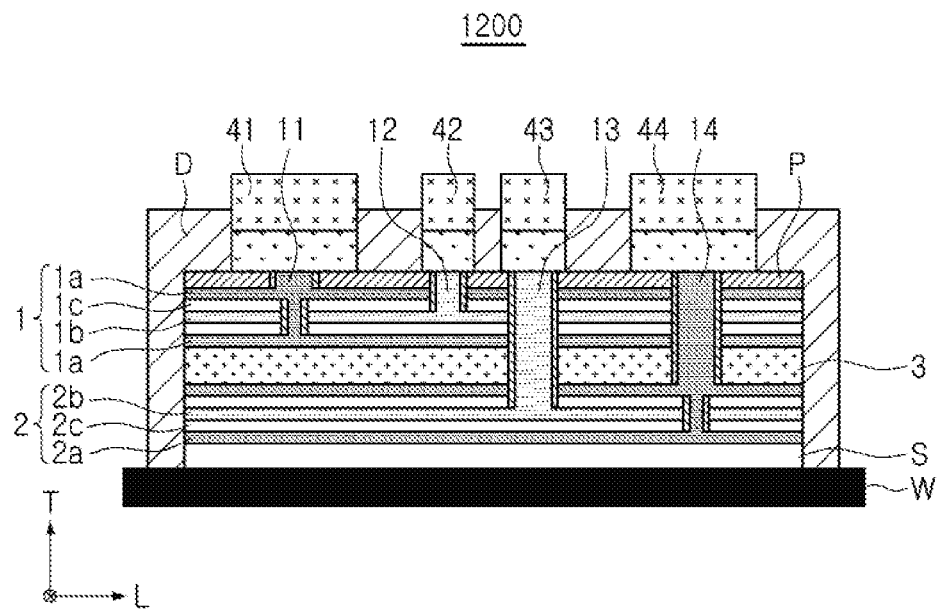
FIG. 12 is a schematic cross-sectional view illustrating a multilayer thin-film capacitor according to a twelfth exemplary embodiment.
Figure 13A:
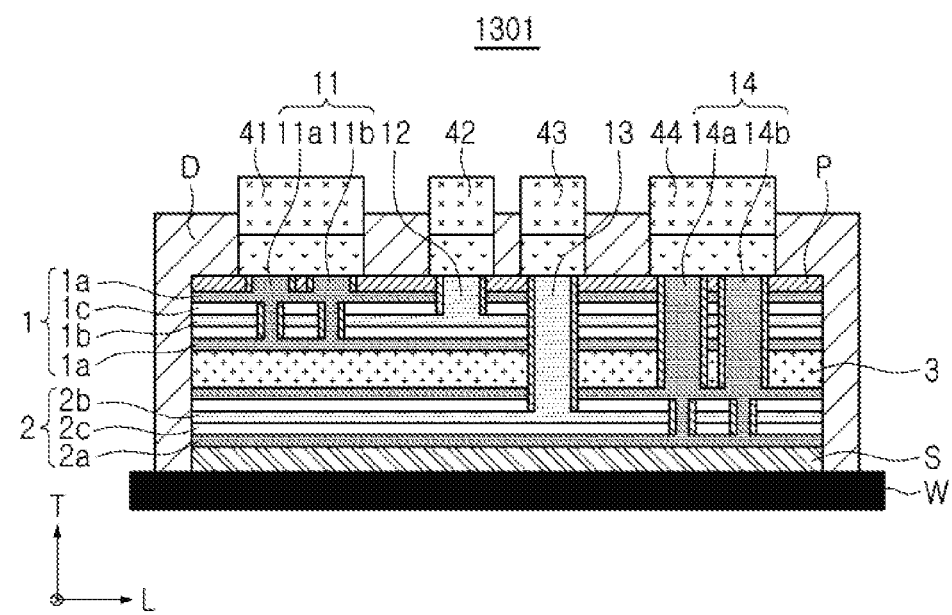
FIGS. 13A through 13G are schematic cross-sectional views illustrating multilayer thin-film capacitors according to modified exemplary embodiments (thirteenth exemplary embodiments) of the sixth to twelfth exemplary embodiments, respectively.
Figure 13B:
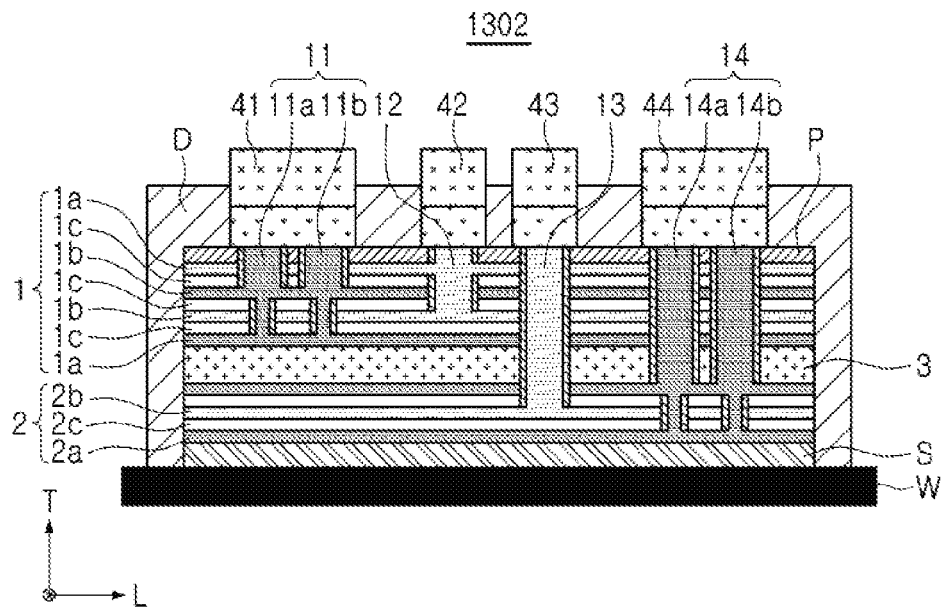
Figure 13C:
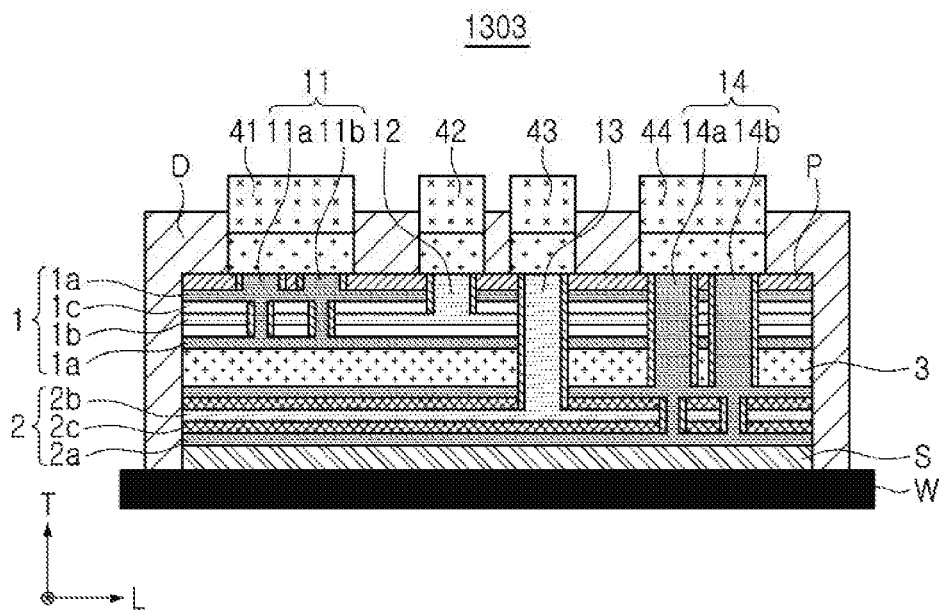
Figure 13D:
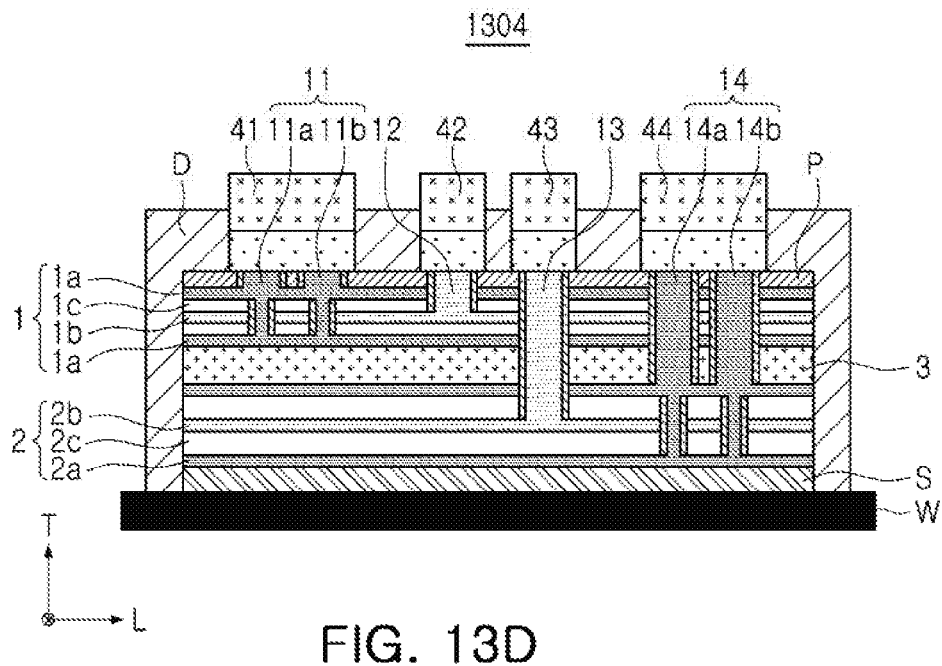
Figure 13E:
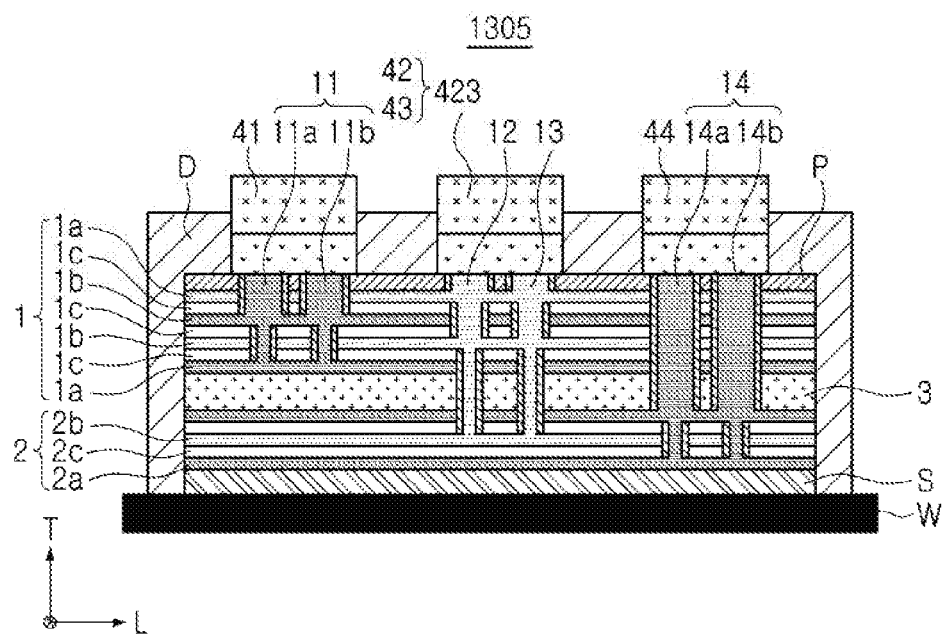
Figure 13F:
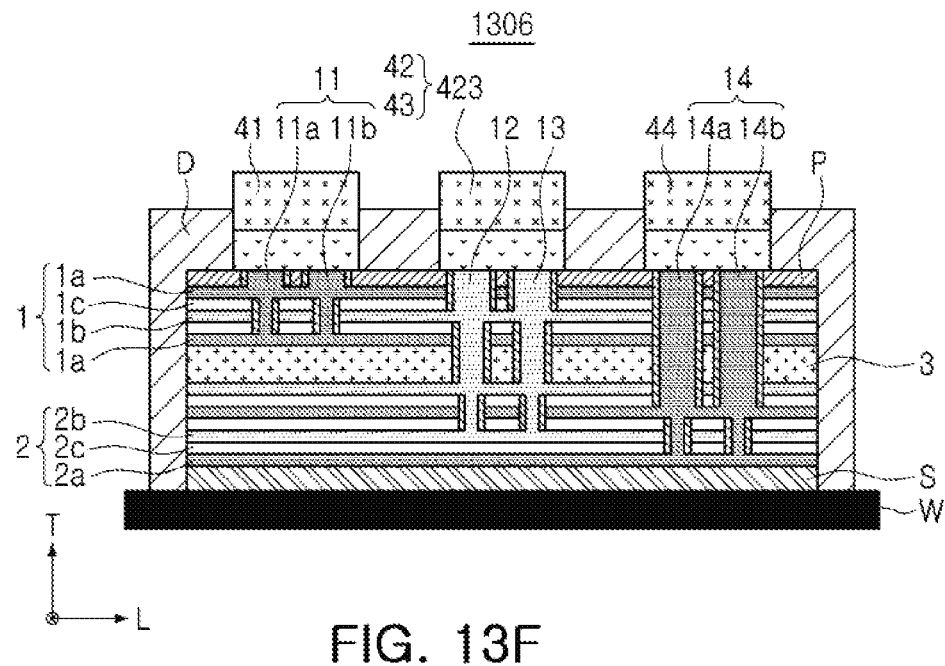
Figure 13G:
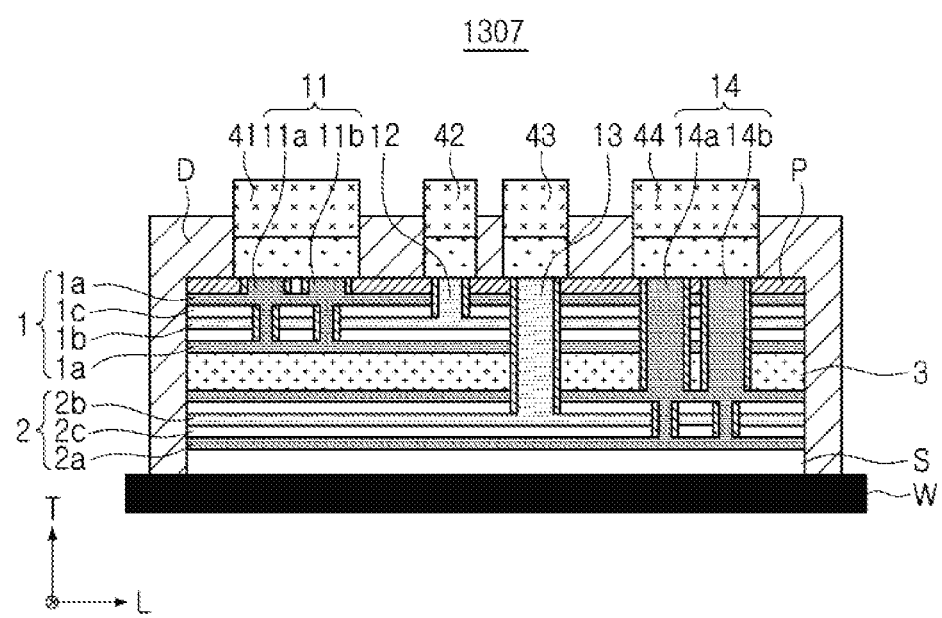

Next, a multilayer thin-film capacitor 1100 according to an eleventh exemplary embodiment will be described with reference to FIG. 11.

The multilayer thin-film capacitor 1100 according to the eleventh exemplary embodiment is similar to the multilayer thin-film capacitor according to the tenth exemplary embodiment in that a second external terminal 42 and a third external terminal constitute a common external terminal 423. However, the multilayer thin-film capacitor 1100 according to the eleventh exemplary embodiment is different from the multilayer thin-film capacitor according to the tenth exemplary embodiment in that the number of dielectric layers 1c in a first multilayer body 1 is smaller than that of dielectric layer 2c in a second multilayer body 2. Therefore, capacitance implemented by connecting internal electrode layers 1a and 1b in the first multilayer body 1 to a first external terminal 41 and the common external terminal 423 may be lower than capacitance implemented by connecting internal electrode layers 2a and 2b in the second multilayer body 2 to the common external terminal 423 and a fourth external terminal 44. This structure may support an effect of capacitance flexibility of the multilayer thin-film capacitor according to the present disclosure.

Twelfth Exemplary Embodiment

Next, a multilayer thin-film capacitor 1200 according to a twelfth exemplary embodiment may have a total of four external terminals 41, 42, 43, and 44 including a second external terminal 42 and a third external terminal 43 split apart from each other.

The multilayer thin-film capacitor 1200 according to the twelfth exemplary embodiment has generally the same structure as that of the multilayer thin-film capacitor 600 according to the sixth exemplary embodiment except that diameters of a second via 12 and a third via 13 are different from each other. When diameters of vias are different from each other, exposed areas of internal electrode layers connected to the vias are different from each other, and control of the diameters of the vias to be different from each other may be used in connection with adjusting the ESR of a capacitor. In addition, a case in which a space in which the vias may be formed is not sufficient frequently occurs in accordance with miniaturization of the capacitor. In this case, it may be useful in a process to control the diameters of the respective vias to be different from each other.

Although not illustrated in detail, capacitance flexibility of the multilayer thin-film capacitor may be significantly increased by allowing the diameters of the vias to be different from each other and allowing materials, thicknesses, and the numbers of dielectric layers 1c and 2c of a first multilayer body 1 and a second multilayer body 2 to be different from each other.

Thirteenth Exemplary Embodiment

Meanwhile, multilayer thin-film capacitors according to a thirteenth exemplary embodiment have substantially the same structures as those of the multilayer thin-film capacitors according to the sixth to twelfth exemplary embodiments described above except that the numbers of first vias and fourth vias are plural. This is to emphasize a degree of freedom of array of vias of multilayer thin-film capacitors according to the present disclosure, and the numbers of vias are not particularly limited, but may be appropriately set in consideration of required characteristics such as exposure areas of internal electrode layers, and the like.

In detail, FIGS. 13A through 13G illustrate cases in which a plurality of first vias 11a and 11b and a plurality of fourth vias 14a and 14b are formed instead of the first vias 11 and the fourth vias 14 of the multilayer thin-film capacitors according to the sixth to twelfth exemplary embodiments, respectively. In addition to modified exemplary embodiments illustrated in FIGS. 13A through 13G, the numbers, structures, depths, and the like, of vias may be freely modified, and FIGS. 13A through 13G illustrate only some exemplary embodiments in order to assist in the understanding of the modified exemplary embodiment.

Meanwhile, although not illustrated in detail, the split layer 3 according to an exemplary embodiment may serve to allow capacitances of capacitors that may be separately driven to be distinguished from each other in terms of function. Therefore, the split layer 3 may be called a capacitance splitting part. The capacitance splitting part may serve to split capacitances of a first capacitor and a second capacitor including, respectively, a first body 1 and a second body 2 to allow capacitances corresponding to the first capacitor, the second capacitor, and a capacitor in which the first and second capacitors are coupled to each other to be independently implemented.

As set forth above, according to the exemplary embodiments in the present disclosure, in a case in which the numbers of internal electrode layers and dielectric layers disposed in chips having the same size are the same as each other, a multilayer thin-film capacitor having significantly increased capacitance and having capacitance flexibility may be provided.

While exemplary embodiments have been shown and described above, it will be apparent to those skilled in the art that modifications and variations could be made without departing from the scope of the present invention as defined by the appended claims.

What is claimed is:

1. A multilayer thin-film capacitor comprising:
    a first multilayer body having a structure in which a plurality of internal electrode layers and dielectric layers are alternately stacked;
    a second multilayer body disposed on a lower surface of the first multilayer body and having a structure in which a plurality of internal electrode layers and dielectric layers are alternately stacked;
    a first external terminal disposed on an upper surface of the first multilayer body and connected to the internal electrode layers of the first multilayer body;
    a second external terminal disposed on the upper surface of the first multilayer body and connected to the internal electrode layers of the first multilayer body and the internal electrode layers of the second multilayer body;
    a third external terminal disposed on the upper surface of the first multilayer body and connected to the internal electrode layers of the second multilayer body; and
    a split layer disposed between the first multilayer body and the second multilayer body to space apart from each other in a vertical direction the first multilayer body and the second multilayer body.

2. The multilayer thin-film capacitor of claim 1, wherein the first multilayer body includes first internal electrode layers and second internal electrode layers alternately disposed with respective dielectric layers interposed therebetween,
    the second multilayer body includes first internal electrode layers and second internal electrode layers alternately disposed with respective dielectric layers interposed therebetween,
    the first internal electrode layers of the first multilayer body are connected to the first external terminal by a first via,
    the first internal electrode layers of the second multilayer body are connected to the third external terminal by a third via, and
    the second internal electrode layers of the first multilayer body and the second internal electrode layers of the second multilayer body are connected to the second external terminal by a second via, such that the second via penetrates through both the first and second multilayer bodies.

3. The multilayer thin-film capacitor of claim 2, wherein the second via consists of a set of plural electrode holes, and the respective electrode holes extend from a lower surface of the second external terminal up to the same second internal electrode layer in the second multilayer body.

4. The multilayer thin-film capacitor of claim 1, wherein the first multilayer body includes first internal electrode layers and second internal electrode layers alternately disposed with respective dielectric layers interposed therebetween,
    the second multilayer body includes first internal electrode layers and second internal electrode layers alternately disposed with respective dielectric layers interposed therebetween,
    the first internal electrode layers of the first multilayer body are connected to the first external terminal by a first via, the first internal electrode layers of the second multilayer body are connected to the third external terminal by a third via, the second internal electrode layers of the first multilayer body and the second internal electrode layers of the second multilayer body are connected to the second external terminal by a second via, and the second via consists of a set of plural electrode holes, and at least one electrode hole in the set extends to the second internal electrode layers of the first multilayer body and the other electrode hole in the set extends to the second internal electrode layers of the second multilayer body.

5. The multilayer thin-film capacitor of claim 4, wherein the at least one electrode hole and the other electrode hole extend to different internal electrode layers.

6. The multilayer thin-film capacitor of claim 1, wherein the second external terminal includes at least two conductive layers, and a surface area of a first conductive layer, disposed in a lowest portion of the at least two conductive layers, is greater than that of a second conductive layer disposed on the first conductive layer.

7. The multilayer thin-film capacitor of claim 1, wherein the number of dielectric layers stacked in the first multilayer body is equal to the number of dielectric layers stacked in the second multilayer body.

8. The multilayer thin-film capacitor of claim 1, wherein capacitance formed by the internal electrode layers in the first multilayer body and the first and second external terminals is equal to capacitance formed by the internal electrode layers in the second multilayer body and the second and third external terminals.

9. The multilayer thin-film capacitor of claim 1, wherein the split layer has insulation properties, and includes $SiO_2$ or an SiNx-based material.

10. A multilayer thin-film capacitor comprising:
a first multilayer body having a structure in which a plurality of internal electrode layers and dielectric layers are alternately stacked;
a second multilayer body disposed on a lower surface of the first multilayer body and having a structure in which a plurality of internal electrode layers and dielectric layers are alternately stacked;
first and second external terminals disposed on an upper surface of the first multilayer body and connected to the first multilayer body by vias to form capacitance; and
third and fourth external terminals disposed on the upper surface of the first multilayer body and connected to the second multilayer body by vias to form capacitance.

11. The multilayer thin-film capacitor of claim 10, wherein the capacitance formed by the connection between the first multilayer body and the first and second external terminals is different from the capacitance formed by the connection between the second multilayer body and the third and fourth external terminals.

12. The multilayer thin-film capacitor of claim 10, wherein materials of the dielectric layers of the first and second multilayer bodies are the same as each other, and a number of dielectric layers stacked in the first multilayer body is greater than a number of dielectric layers stacked in the second multilayer body.

13. The multilayer thin-film capacitor of claim 10, wherein numbers of dielectric layers stacked in the first and second multilayer bodies are the same as each other, and the dielectric layers in the first multilayer body include a material having a higher dielectric constant than a dielectric constant of a material of the dielectric layers in the second multilayer body.

14. The multilayer thin-film capacitor of claim 10, wherein each of the dielectric layers included in the first multilayer body has a thickness less than a thickness of each of the dielectric layers included in the second multilayer body.

15. The multilayer thin-film capacitor of claim 10, wherein the first multilayer body includes first internal electrode layers and second internal electrode layers having a polarity different from a polarity of the first internal electrode layers, the first internal electrode layers of the first multilayer body are connected to the first external terminal by a first via, and the second internal electrode layers of the first multilayer body are connected to the second external terminal by a second via, and the second multilayer body includes first internal electrode layers and second internal electrode layers having a polarity different from a polarity of the first internal electrode layers of the second multilayer body, the first internal electrode layers of the second multilayer body are connected to the third external terminal by a third via, and the second internal electrode layers of the second multilayer body are connected to the fourth external terminal by a fourth via.

16. The multilayer thin-film capacitor of claim 15, wherein the second via extends to the second internal electrode layers in the second multilayer body, and has a same depth as the third via.

17. The multilayer thin-film capacitor of claim 10, wherein the second external terminal and the third external terminal share a seed layer and a plating layer with each other to constitute a common external terminal.

18. The multilayer thin-film capacitor of claim 17, wherein the second via and the third via, connected to the common external terminal, extend to the same second internal electrode layers in the second multilayer body.

19. A multilayer thin-film capacitor comprising:
a first body including dielectric material layers and electrode material layers;
a second body including dielectric material layers and electrode material layers;
a capacitance splitting part disposed between the first body and the second body; and
first, second, and third external electrode layers electrically isolated from each other and each electrically connected to a different one or more of the electrode material layers in the first body and the electrode material layers in the second body,
wherein the third external electrode layer is electrically connected to one or more of the electrode material layers in the first body and to one or more of the electrode material layers in the second body.

20. The multilayer thin-film capacitor of claim 19, wherein the first body includes a stack of alternating dielectric material layers and electrode material layers, and the second body includes a stack of alternating dielectric material layers and electrode material layers, and
wherein the capacitance splitting part is disposed between the first body and the second body stacked in a stacking direction of the stack of dielectric material layers and electrode material layers of the first body.

21. The multilayer thin-film capacitor of claim 19, wherein the capacitance splitting part is a split layer separating the first body and the second body in a vertical direction.

22. The multilayer thin-film capacitor of claim 19, wherein the first, second, and third external electrode layers are disposed on a same side of the first body opposite to another side of the first body facing the second body.

23. The multilayer thin-film capacitor of claim 19, wherein the second body is stacked below the first body in the stacking direction, and
the first external electrode layer is disposed above the first body and electrically connected to one or more of the electrode material layers in the first body and the second external electrode layer is disposed above the first body and electrically connected to one or more of the electrode material layers in the second body.

24. The multilayer thin-film capacitor of claim 23, wherein the second external electrode layer is insulated from all electrode material layers in the first body.

25. The multilayer thin-film capacitor of claim 23, wherein the third external electrode layer is disposed above the first body.

26. A multilayer thin-film capacitor comprising:
a first body including a stack of at least three internal electrode layers alternating with dielectric layers therebetween;
a second body spaced apart from the first body and including a stack of at least three internal electrode layers alternating with dielectric layers therebetween;
first and second external terminals disposed above the first body in a stacking direction of the stack of alternating dielectric layers and internal electrode layers in the first body, the first external terminal electrically connected to two or more of the internal electrode layers in the first body, and the second external terminal electrically connected to two or more of the internal electrode layers in the second body; and
a third external terminal electrically isolated from the first and second external terminals and electrically connected to one or more other internal electrode layers in the first body and to one or more other internal electrode layers in the second body.

27. The multilayer thin-film capacitor of claim 26, further comprising a first via electrically connecting the first external terminal to the two or more of the internal electrode layers in the first body, and a second via extending through the first body, electrically isolated from the internal electrode layers of the first body, and electrically connecting the second external terminal to the two or more of the internal electrode layers in the second body.

28. The multilayer thin-film capacitor of claim 26, wherein the third external terminal is disposed above the first body in the stacking direction.

29. A multilayer thin-film capacitor comprising:
first and second bodies each including a stack of at least three internal electrode layers alternating with dielectric layers therebetween;
a first external electrode layer electrically connected to two or more of the internal electrode layers in the first body; and
a second external electrode layer electrically isolated from the first external electrode layer and electrically connected to one or more other internal electrode layers in the first body and to one or more internal electrode layers in the second body,
wherein the first body and the second body are spaced apart from each other and stacked in a stacking direction of the stack of dielectric layers and internal electrode layers of the first body, and
wherein the disposition of the dielectric layers between the first and second bodies is asymmetric.

30. The multilayer thin-film capacitor of claim 29, wherein the asymmetric disposition of the dielectric layers between the first and second bodies is provided by a number of the dielectric layers in the first body being different from a number of the dielectric layers in the second body.

31. The multilayer thin-film capacitor of claim 29, wherein the asymmetric disposition of the dielectric layers between the first and second bodies is provided by a thickness of the dielectric layers in the first body being different from a thickness of the dielectric layers in the second body.

32. The multilayer thin-film capacitor of claim 29, wherein the asymmetric disposition of the dielectric layers between the first and second bodies is provided by a material of the dielectric layers in the first body is-being different from a material of the dielectric layers in the second body.

* * * * *